(12) United States Patent
Shaw et al.

(10) Patent No.: US 6,434,931 B1
(45) Date of Patent: Aug. 20, 2002

(54) HYDRAULIC BRAKE MASTER CYLINDER WITH CONTROLLED CENTER PORT VALVE GAP AND METHOD OF ASSEMBLY

(75) Inventors: Schuyler S. Shaw, Dayton; Elaine A. Ruble, Bellbrook, both of OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/853,376

(22) Filed: May 11, 2001

(51) Int. Cl.[7] ................................................ B60T 11/28
(52) U.S. Cl. .............................. 60/327; 60/589; 91/422
(58) Field of Search .......................... 60/327, 589, 591; 91/422

(56) References Cited

U.S. PATENT DOCUMENTS 4,709,551 A * 12/1987 Saalbach et al. ............... 60/589
5,161,376 A * 11/1992 Hartmann ................. 60/589 X
5,179,834 A * 1/1993 Rauschenbach .............. 60/327
5,214,917 A * 6/1993 Crumb et al. ............. 60/589 X

FOREIGN PATENT DOCUMENTS

| EP | 0601769 A | 6/1994 |
| GB | 2225618 A | 6/1990 |
| GB | 2242947 A | 10/1991 |

* cited by examiner

*Primary Examiner*—John E. Ryznic
(74) *Attorney, Agent, or Firm*—Scott A. McBain

(57) ABSTRACT

A hydraulic brake master cylinder assembly includes a central or center port compensation valve mounted in respective brake actuator pistons and having a variable length stem which may be adjusted to predetermine the amount of valve travel between open and closed positions in response to actuation of the brake cylinder piston or pistons. The variable length stem includes a hub and a sleeve which is force fit over the hub and may be moved to set the length of the stem. The amount of gap or open position of the valve in the primary piston may be determined by installing the primary piston in the master cylinder, holding the piston in a fixed position and installing a seal retainer and washer for engaging the primary piston pin to move the pin to set the length of the valve stem.

23 Claims, 3 Drawing Sheets

HYDRAULIC BRAKE MASTER CYLINDER WITH CONTROLLED CENTER PORT VALVE GAP AND METHOD OF ASSEMBLY

BACKGROUND OF THE INVENTION

In automotive vehicle hydraulic brake systems, the brake mechanisms are actuated through a hydraulic circuit which includes a so-called master cylinder or actuator. The master cylinder, normally, includes two tandem arranged pistons which displace hydraulic fluid to respective brake circuits. Each piston is typically provided with a so-called center port or central compensation valve which operates to relieve pressure in the brake circuit when the brake pedal is released and to provide a supply of makeup fluid to the cylinder chambers for subsequent brake actuating cycles.

One longstanding problem associated with central or center port compensation valves for hydraulic brake master cylinders is related to the tolerances in the working parts of the master cylinder which can cause excessive brake pedal travel before the center port valves are closed and hydraulic pressure is applied to the brake circuits. Excessive brake pedal travel or so-called travel loss caused by delayed closing of the compensation valves is undesirable from the standpoint of brake operator reaction, as well as the fact that the pedal travel loss delays the application of braking effort on the vehicle.

Various efforts have been put forth toward controlling the center port compensation valve clearance or gap variation problem with a view to minimizing brake pedal travel loss. However, the present invention is believed to provide a superior solution to the problem by providing an improved compensation valve construction and an improved method of assembling the components of a brake master cylinder to reduce the valve clearance or valve gap variation and to minimize the amount of brake pedal travel required to initiate braking effort in a brake system using a master cylinder which includes the present invention.

BRIEF SUMMARY OF THE INVENTION

The present invention provides an improved hydraulic brake master cylinder assembly including one or more central or center port compensation valves.

In accordance with one aspect of the invention, a hydraulic master cylinder assembly is provided with one or more center port compensation valves which include a clearance or gap between a valve closure member and a valve seat and which is set at the time of assembly of the master cylinder to minimize brake pedal travel loss during operation of the brake master cylinder.

In particular, a center port compensation valve is provided which includes a closure member which engages a compensation valve actuator pin by a stem part which is of variable length and which, in accordance with a method of the invention, is set to a predetermined length at the time of assembly of the master cylinder. The center port compensation valve is advantageously configured to include an elastomer closure member with an actuator stem comprising a shaft part and a sleeve part which is force fitted over the shaft part. The stem part may be set to a desired length at the time of assembly of the master cylinder and its component parts.

Thanks to the configuration of the center port compensation valve, excessive and varied valve movement between open and closed positions is eliminated to thereby minimize brake pedal or brake actuator travel loss during operation of a brake system including a master cylinder assembly in accordance with the invention.

The invention further contemplates the provision of a tandem master cylinder assembly including a primary piston and a secondary piston, each piston including a center port compensation valve in accordance with the invention. Each compensation valve is set to have a predetermined actuator stem length at the time of assembly of the master cylinder and its components using a method in accordance with the invention.

Still further, the invention contemplates a method for assembling a hydraulic brake master cylinder including one or more pistons slidable in a master cylinder bore, each piston including a central or center port compensation valve whose operating characteristics may be set at the time of assembly, thanks to the unique configuration of the compensation valve.

Those skilled in the art will further appreciate the above-noted advantages and superior features of the invention, together with other important aspects thereof upon reading the detailed description which follows in conjunction with the drawings.

DETAILED DESCRIPTION OF THE INVENTION

Figure 1:
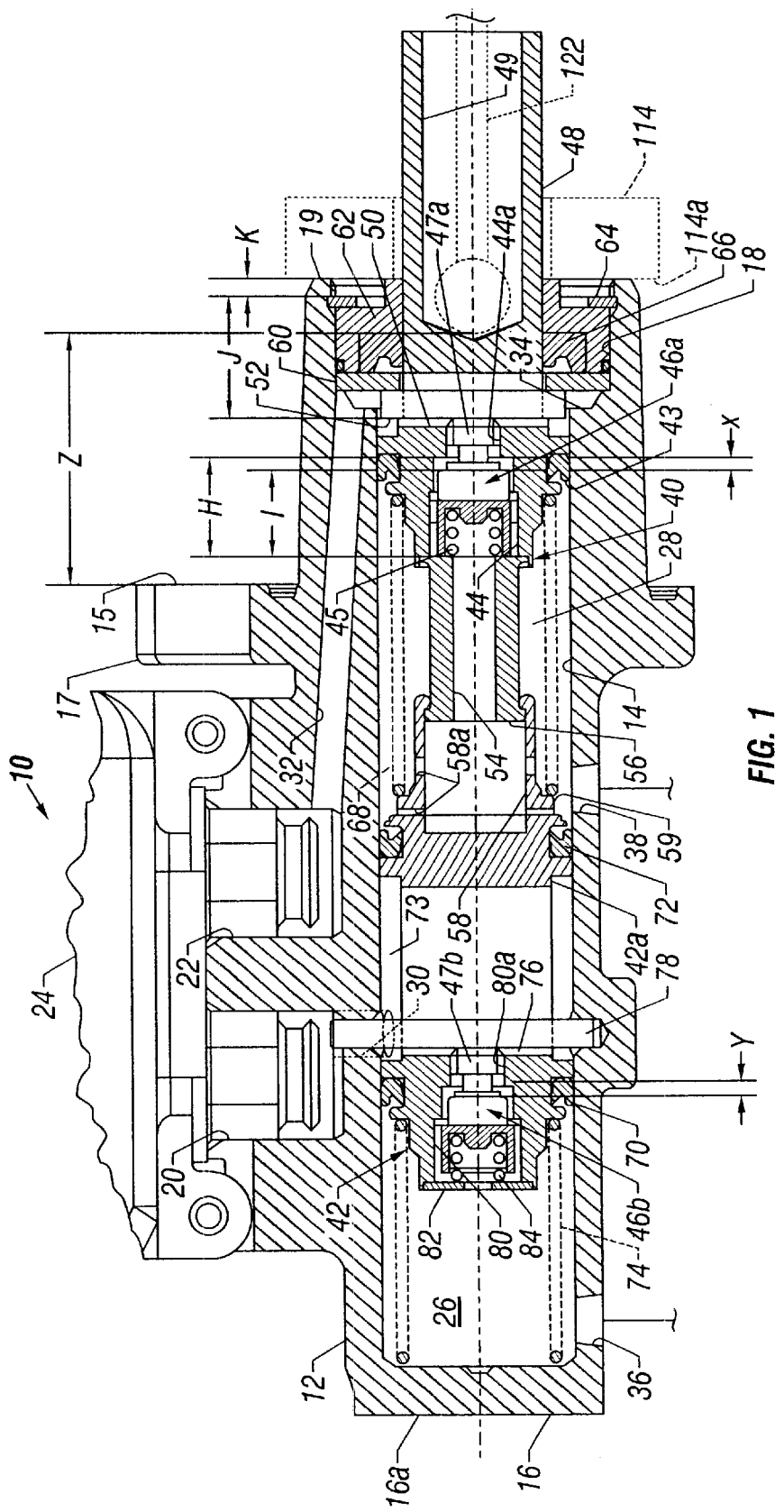
FIG. 1 is a longitudinal central section view of a hydraulic brake master cylinder assembly including center port compensation valves in accordance with the invention.

In the description which follows, like parts are marked throughout the specification and drawing with the same reference numerals, respectively. The drawing figures may not be to scale in the interest of clarity and conciseness.

Referring to FIG. 1, there is illustrated a hydraulic brake master cylinder assembly including center port compensation valves in accordance with the invention, the master cylinder assembly being generally designated by the numeral 10. The master cylinder assembly 10 includes a somewhat conventional master cylinder housing 12, including a longitudinal central cylindrical bore 14 which is closed at one end by an end wall 16 and opens into an enlarged diameter coaxial bore 18. Bore 18 opens to a transverse end face 19 at the opposite end of housing 12 to provide for assembly and disassembly of the internal parts of the master cylinder assembly. Cylinder housing 12 also includes a mounting face 15 formed on a transverse flange 17. Flange 17 is adapted for connecting the master cylinder assembly 10 to a brake system actuator or so-called power boost assembly, not shown. Cylinder housing 12 further includes spaced apart lateral projecting ports 20 and 22 which are adapted to receive a conventional brake fluid reservoir 24 whereby hydraulic brake fluid may be supplied to fluid chambers 26 and 28 by way of suitable passages 30 and 32. Passage 30 opens into the bore 14 directly and passage 32 opens into bore 14 by way of a counterbore 34 intermediate the bore 14 and the enlarged diameter bore 18. Chambers 26 and 28 are in communication with hydraulic brake circuits, not shown, by way of ports 36 and 38, for example.

Master cylinder assembly 10 is also characterized by a primary hydraulic actuator piston 40 and a secondary or floating piston 42 of somewhat conventional construction except as noted herein. Primary piston 40 is slidably disposed in cylinder bore 14 and is sealingly engaged therewith by a suitable elastomer seal 43. Piston 40 includes a stepped cylindrical bore 44 formed therein and in which is disposed a center port compensation valve closure member 46a, see FIG. 1B also, which will be described in further detail herein. Piston 40 also includes an integral elongated axially extending actuator member 48 having a central axial bore 49 formed therein for receiving an actuator rod of a conventional brake actuator mechanism, which may include a power boost assembly or a suitable linkage directly connecting the actuator rod to a brake pedal. An elongated slot 50 extends transversely through the piston 40 at the actuator member 48, as illustrated, and receives an elongated transversely extending cylindrical pin 52 disposed therein. Pin 52 is operably engaged with a stem part 47a of the valve closure member 46a.

Figure 1A:
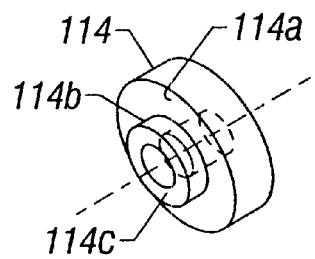
FIG. 1A is a detail perspective view of a tool used in setting the length of the stem part for the primary piston compensation valve.
Figure 1B:
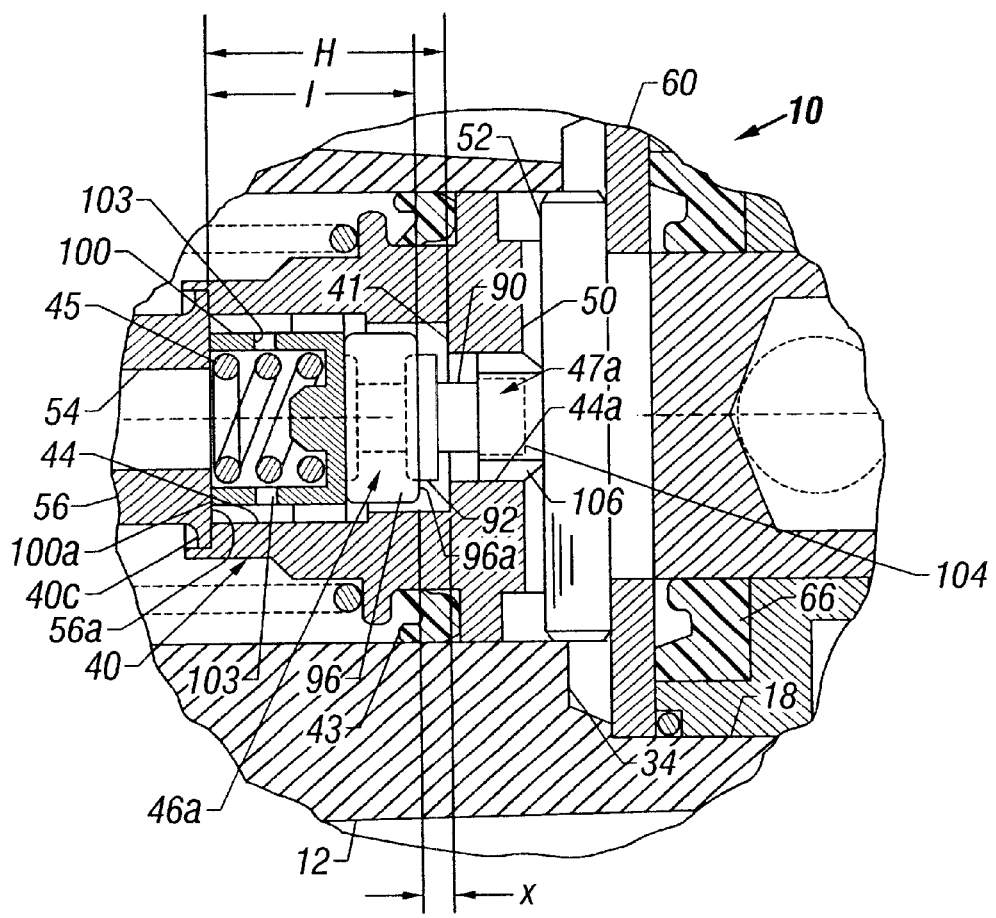
FIG. 1B is a detail section view of the primary piston shown in FIG. 1 but on a larger scale.

In the position of the pin 52 with respect to the piston 40 shown in FIGS. 1 and 1B, the valve closure member 46a is held in an open position to permit flow of fluid between passage 32 and chamber 28. The flow path includes a passage 54 formed in an elongated sleeve 56 which is engaged with a tubular piston stop part 58 for limited axial sliding movement with respect thereto in a conventional manner. Fluid may flow between the stepped bore 44 and the chamber 28 through passage means 58a when the valve closure member 46a is held in an open position by the pin 52. Closure member 46a is biased toward a valve closed position by a coil spring 45 engaged with one end 56a of sleeve 56, as shown in FIG. 1B. Pin 52 is dimensioned to slide within bore 14 and also be freely movable in slot 50 under urging of closure member 46a.

As further shown in FIG. 1, primary piston 40 is retained in cylinder bore 14 by an annular retainer member or washer 60 which is engaged with a seal retainer 62. Retainer 62 is retained in bore 18 by a suitable snap-ring type retaining ring 64. A conventional elastomer lip seal 66 is supported by retainer 62 and is engageable with actuator member 48 to form a fluid tight seal while allowing axial movement of the primary piston 40 within the bore 14.

Referring further to FIG. 1, a conventional coil compression spring 68 extends between piston 40 and piston stop 59. Piston stop 59 is engaged with secondary piston 42 which is slidably disposed in bore 14 and is provided with spaced apart elastomer seals 70 and 72 which delimit a chamber 73 in bore 14 and which is in fluid flow communication with port 30. A second coil compression spring 74 is interposed piston 42 and housing end wall 16 to bias piston 42 to the right, viewing FIG. 1. An elongated slot 76 is formed in a reduced diameter hub part 42a of piston 42 and receives a transversely extending cylindrical pin 78 therein. Pin 78 is suitably retained in opposed coaxial bore portions formed in housing 12 and intersecting longitudinal bore 14, as shown. Pin 78 is operably engaged with a second center port compensation valve closure member 46b which includes an axially extending stem part 47b engageable with the pin 78, as shown in FIG. 1. Compensation valve 46b is slidably disposed in a stepped axially extending bore 80 formed in secondary piston 42 and is retained therein by a suitable retainer ring 82. A coil spring 84 is interposed ring 82 and the closure member 46b for biasing the closure member toward the pin 78 and a valve closed position.

The operation of the master cylinder assembly 10 is believed to be within the purview of one skilled in the art of hydraulic brake systems. However, briefly, when an actuator rod, not shown, is operably inserted in bore 49 and engaged with the actuator member 48 of primary piston 40 with a force to move the piston to the left within bore 14, viewing FIG. 1, within bore 14, valves 46a and 46b are initially in open positions to allow fluid to flow between chamber 28 and passage 32 and between chamber 26 and passage 30 by way of the stepped bores 44 and 80, respectively. However, when piston 40 undergoes a slight amount of travel to the left, viewing FIG. 1, the piston will move with respect to the pin 52, due to the slot 50, allowing spring 45 for valve closure member 46a to bias the closure member to the closed position closing off the flow of fluid through reduced diameter bore 44a. The amount of travel of piston 40 required before valve closure member 46a closes is the so-called valve gap distance and is indicated by dimension "X" in FIG. 1.

When piston 40 moves to the left, viewing FIG. 1, hydraulic fluid in chamber 28 and spring 68 also bias piston 42 to the left whereby valve closure member 46b also moves to the closed position closing off the flow of fluid through reduced diameter bore 80a as the piston 42 moves with respect to the pin 78. The amount of travel of piston 42 required to effect closure of closure member 46b is indicated in FIG. 1 as the valve gap distance "Y". Distances "X" and "Y" are desirably maintained at a predetermined minimum sufficient to allow fluid flow through bores 44a and 80a and with a view to minimizing the variation in such distances as a consequence of dimensional tolerances associated with the working parts of the master cylinder assembly 10. An improved method of maintaining consistency of and setting the actual dimensions of gaps "X" and "Y" for the compensation valves 46a and 46b will be described hereinbelow.

Figure 2:
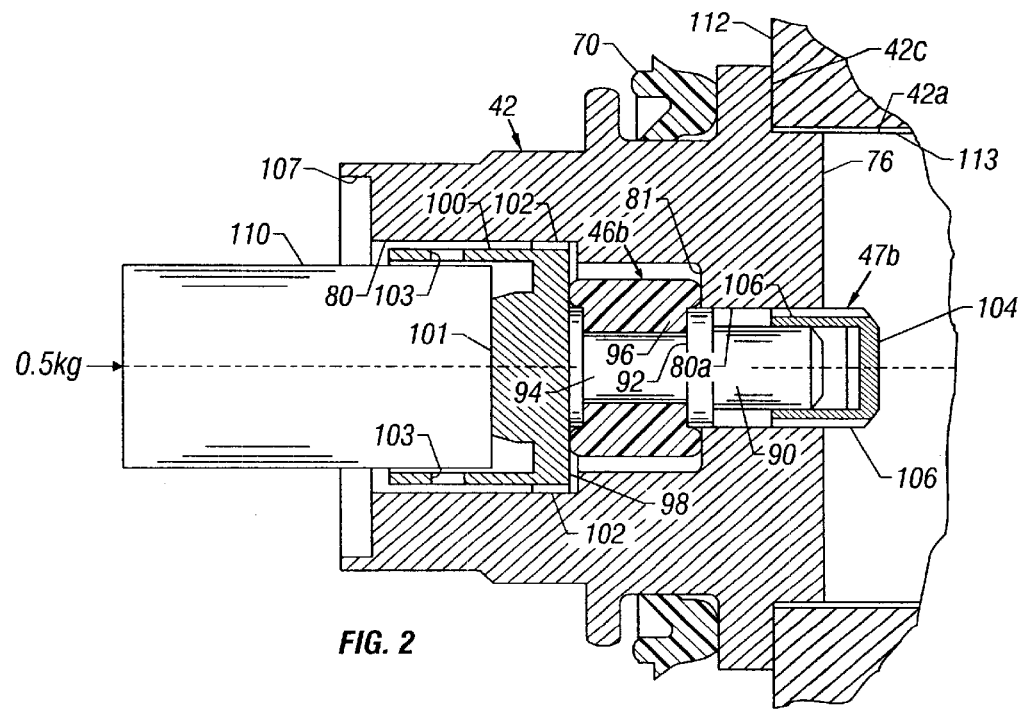
FIG. 2 is a view illustrating a first step in a method of setting the desired length of an actuating stem part for the secondary piston compensation valve for the master cylinder assembly shown in FIG. 1.
Figure 3:
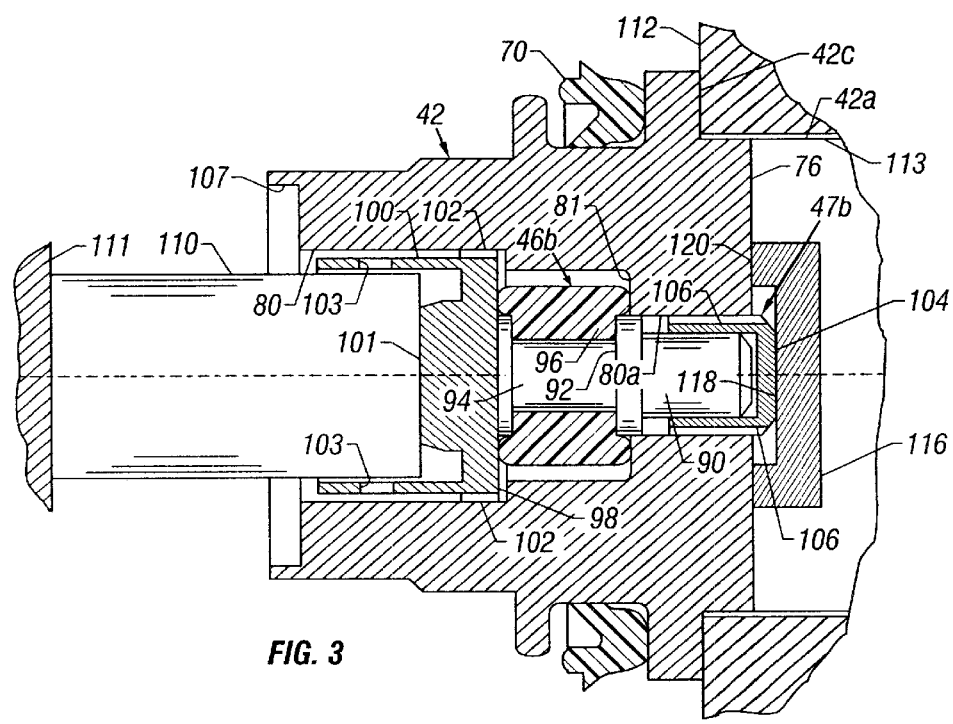
FIG. 3 is a view similar to FIG. 2 showing a further step in the method of setting the length of the actuating stem part for the compensation valve shown in FIG. 2.

With regard to compensation valve closure members 46a and 46b, these valves are preferably identical and further details of compensation valve closure member 46b are shown in FIGS. 2 and 3. Referring to FIG. 2, valve closure member 46b includes an adjustable length stem part 47b characterized by an elongated cylindrical stem hub 90 delimited by a cylindrical shoulder 92 which is contiguous with a reduced diameter stem part 94. A cylindrical ring shaped elastomer closure part 96 is retained between the shoulder 92 and a transverse end face 98 of a spring retainer sleeve part 100. Spring retainer sleeve part 100 includes circumferentially spaced radial extending bearing pad portions 102 for slidably locating the closure member 46b within stepped bore 80 while allowing fluid to flow between bore portions 80 and 80a when the closure member 96 is unseated from transverse end face 81 comprising a valve seat within piston 42. Sleeve 100 may include transverse flow ports 103 formed therein, also.

Adjustable length stem part 47b also includes a tubular sleeve member 104 which is disposed over stem hub 90 and is a slidable force fit thereon. Stem sleeve port 104 includes circumferentially spaced longitudinal grooves 106, two shown, extending the length thereof to allow fluid to flow through bore portion 80a when the elastomer closure ring 96 is unseated from end face 81.

The length of stem part 47b may be adjusted in accordance with a method wherein, at the time of assembly of the closure member 46b to the piston 42, the closure member is placed in the position shown in FIG. 2 and engaged with a generally cylindrical work member 110 which engages a central hub portion 101 of spring retainer sleeve 100. A moderate axial force, say about 0.5 kg, is applied to urge the closure member ring 96 into engagement with the seat or face 81. Work member 110 is engaged with the closure member 46b upon placement of the piston 42 in a suitable fixture 112 which may have a somewhat unshaped slot 113 formed therein for receiving the piston 42. An annular shoulder 42c on piston 42 is engageable with the fixture 112 so that the axial force may be applied by the work member 110 in the arrangement shown in FIG. 2. Work member 110 is held against a stop 111, FIG. 3, while maintaining the above noted biasing force on closure member 46b.

The length of stem part 47b is then adjusted by providing a suitable work member 116, FIG. 3, having a recess delimited by a surface 118 which is a known depth from another and parallel surface 120 on work member 116. Member 116 is inserted in slot 76 and forcibly engaged with stem sleeve part 104 to cause this sleeve part to move axially with respect to stem hub part 90 to effectively set the length of the stem part 47b. Since stem sleeve part 104 is a moderate force fit over stem hub 90, a force applied to work member 116 is required to be sufficient to move the stem sleeve part 104 to the position shown in FIG. 3. In this way, the length of the closure member stem 47b is preset and, on assembly of the piston 42 to the master cylinder housing 14, and placement of the pin 78 in its working position, as shown in FIG. 1, the gap or amount of movement "Y" of the closure ring 96 with respect to valve seat or face 81 to the valve open position is predetermined when the piston 42 is at rest in the position shown in FIG. 1.

Accordingly, the amount of travel required of piston 42 with respect to pin 78 to effect closure of the compensation valve 46b is dimension "Y" since, once the piston moves to the left, viewing FIG. 1, the spring 84 will cause the closure member 46b to move to a position to close off flow of fluid through bore 80a. Thus, the amount of travel of closure member 46b in response to movement of the pistons 40 and 42, to the left, viewing FIG. 1, may be easily predetermined by setting the length of the valve stem 47b, as described above.

As mentioned above, compensation valve closure member 46a is substantially identical to closure member 46b including stem part 47a which is characterized by a stem sleeve 104, FIG. 1B, disposed in moderate force fitting relationship over a stem hub 90 which also supports an elastomer closure ring 96 engageable with a valve seat formed by a transverse end face 41, FIG. 1B, in stepped bore 44. Closure member stem 47a is engageable with pin 52 and is biased into engagement with the pin by spring 45. Closure member stem 47a also includes a sleeve 100 which is shown engaged with a transverse end face 56a of primary piston sleeve 56. Coil spring 45 is journaled within sleeve 100 and biases closure member 46a toward pin 52.

Compensation valve gap dimension "Y", once set, is followed by final assembly of the primary piston 40 and secondary piston 42 into the bore 14 together with the return springs 68 and 74, arranged as shown in FIG. 1. With the pistons 40 and 42 installed in the bore 14 the dimension "Z", FIG. 1, may be determined. Dimension Z is the distance between mounting face 15 for cylinder housing flange 17 and the point of contact of a brake actuator rod 12 with piston actuator member 48 within the bore 49 of the member 48. Dimension Z can be measured and then stamped on the master cylinder housing 12 at a suitable location, such as on end wall surface 16a, for example, FIG. 1. The brake system actuator or actuator assembly, not shown, would then have its actuator rod length set so that when assembled to the master cylinder assembly 10 the dimensions X and Y would vary only by the tolerance of the length of an actuator rod 122 which varied from that desired and the tolerances in the dimensions of the elastomer closure rings 96 on the respective closure members 46a and 46b.

After determining dimension Z, the gap or amount of opening of the closure member 46a (i.e., dimension X) would be set by gripping the primary piston 40 to hold same stationary in its assembled position within the bore 14 and then pushing the washer 60, seal retainer 62 and snap ring 64 into the bore 18 with a tool 114, FIGS. 1 and 1A, until a surface 114a on tool 114 engages the transverse end face 19 of housing 12. This action forces the pin 52 against closure member 47a which, initially, is configured such that sleeve 104 is extended axially a substantial distance from shoulder 92, see FIG. 1B. Tool 114 includes a reduced diameter hub 114b, FIG. 1A, having a face 114c which is disposed dimension "K" from face 114a. Closure member 46a is pushed open to the position shown in FIGS. 1 and 1B wherein sleeve 100 engages surface 56a and sleeve 104 slides along hub 90 under the urging of the force exerted on the pin 52 by the tool 114.

In this way, the gap or dimension X is set and this gap may be predetermined to be a certain amount which includes the tolerances, added together, of dimensions "H", "I", "J" and "K". Dimension H is the distance between a transverse end face 40c formed in piston 40, FIG. 1B, and the valve seat or face 41. As also shown in FIG. 1B, dimension I is the distance between end face 100a of sleeve 100 and a side edge 96a of closure ring 96. Still further, viewing FIG. 1, dimension J is the distance between the side face of retaining ring 64 which is engageable with tool surface 114c and the side edge of pin 52 when the pin is engaged with washer 60 and retainer 62, as shown in the assembled position in FIG. 1. These tolerances may be predetermined and relied upon in selecting the length of the gap or dimension X. Accordingly, upon actuation of the pistons 40 and 42, a known and predetermined amount of travel of the pistons, to the left, viewing FIG. 1, will occur before the compensation valves 46a and 46b reach their closed positions to begin pressure buildup within the chambers 26 and 28. In this way, a reduced and controlled amount of brake pedal travel loss is experienced with a brake master cylinder assembly 10, including the compensation valves and method in accordance with the present invention.

The construction and operation of the master cylinder assembly 10 is believed to be within the purview of those skilled in the art of hydraulic brake systems based on the foregoing description. Conventional engineering materials may be used to fabricate the parts of the master cylinder assembly 10 described hereinabove and which are known to those skilled in the art of hydraulic brake equipment. Although preferred embodiments of a master cylinder assembly, compensation valve and method have been described in detail hereinabove, those skilled in the art will also recognize that various substitutions and modifications may be made without departing from the scope and spirit of the appended claims.

What is claimed is:

1. A hydraulic brake master cylinder assembly comprising:
   a cylinder housing having an axial cylindrical bore formed therein;
   a first piston axially slidable in said bore and defining with said bore a first pressure chamber;

passage means in said housing for communicating hydraulic fluid between a reservoir and said first pressure chamber; and a first compensation valve for controlling flow of hydraulic fluid between said passage means and said first pressure chamber, said first compensation valve comprising a first closure member including an actuating part, said actuating part being selectively adjustable to vary a gap formed between said first closure member and a valve seat.

2. The master cylinder assembly set forth in claim 1 wherein:

said first closure member is mounted on said first piston.

3. The master cylinder assembly set forth in claim 2 wherein:

said actuating part is engageable with a member disposed in said housing and is responsive to movement of said first piston in said bore to move between valve open and valve closed positions.

4. The master cylinder assembly set forth in claim 2 including:

a biasing spring operable to bias said first closure member to a valve closed position.

5. The master cylinder assembly set forth in claim 2 wherein:

said actuating part comprises a stem including a hub part and a sleeve disposed over and engaged with said hub part by a force fit, said sleeve being operable to be movable with respect to said hub part in response to a predetermined force acting thereon to selectively vary the length of said stem.

6. The master cylinder assembly set forth in claim 5 wherein:

said first closure member includes an elastomer member mounted on said stem and engageable with a surface on said piston forming said valve seat.

7. The master cylinder assembly set forth in claim 1 wherein:

said master cylinder assembly includes a second piston disposed in said bore and spaced from said first piston to define said first pressure chamber and a second pressure chamber in said bore; and a second compensation valve operable to control the flow of hydraulic fluid between said second pressure chamber and further passage means in said housing.

8. The master cylinder assembly set forth claim 7 wherein:

said second closure member includes an actuating part selectively adjustable to vary a gap formed between said second closure member and a valve seat therefor.

9. The master cylinder assembly set forth in claim 8 wherein:

said second closure member is mounted on said second piston.

10. The master cylinder assembly set forth in claim 9 wherein:

said actuating part for said second closure member is engageable with a member disposed in said housing and is responsive to movement of said second piston in said bore to move between valve open and valve closed positions.

11. The master cylinder assembly set forth in claim 10 including:

a biasing spring operable to bias said second closure member to a valve closed position.

12. The master cylinder assembly set forth in claim 10 wherein:

said actuating part for said second closure member comprises a stem including a hub part and a sleeve disposed over and engaged with said hub part by a force fit, said sleeve being operable to be movable with respect to said hub part in response to a predetermined force acting thereon to selectively vary the length of said stem.

13. The master cylinder assembly set forth in claim 12 wherein:

said second closure member includes an elastomer member mounted on said stem and engageable with a surface on said second piston forming said valve seat.

14. In a hydraulic brake master cylinder, a cylinder housing having an axial cylindrical bore formed therein, a piston axially slidable in said bore and defining with said bore a pressure chamber, passage means in said housing for communicating hydraulic fluid between a reservoir and said pressure chamber, and a compensation valve mounted in said piston for controlling flow of hydraulic fluid between said passage means and said pressure chamber, said compensation valve comprising a closure member including an actuating part comprising a stem including a hub part and a sleeve disposed over and engaged with said hub part by a force fit, said sleeve being operable to be movable with respect to said hub part in response to a predetermined force acting thereon to selectively vary the length of said stem to control a gap formed between said closure member and a valve seat upon actuation of said piston.

15. A method for setting a compensation valve for a hydraulic brake master cylinder to limit the travel of said compensation valve between open and closed positions in response to actuation of a brake actuator connected to said master cylinder, comprising the steps of:

providing a brake master cylinder housing including a bore formed therein, and a piston operable to be disposed for axial sliding movement in said bore;

providing a compensation valve including a closure member having an actuating part of selectively variable dimension and engageable with a member supported in said housing; and engaging said actuating part to set said dimension thereof to correspond to a predetermined valve open position of said closure member during operation of said master cylinder in a brake system.

16. The method set forth in claim 15 including the step of:

installing said compensation valve on said piston prior to setting said dimension of said actuating part.

17. The method set forth in claim 15 including the steps of:

installing said piston in said bore in said housing; and causing said member supported in said housing to move relative to said piston to engage said actuating part to set said variable dimension thereof to a predetermined amount.

18. The method set forth in claim 17 wherein:

the step of causing said member supported in said housing to move relative to said piston includes the step of holding said piston in a predetermined position with respect to said housing and moving said member supported in said housing with respect to said housing and said piston to engage said actuating part.

19. The method set forth in claim 17 including the steps of:

determining the distance between a reference surface on said housing and a reference point on said piston with said piston installed in said housing and comparing said distance to a dimension associated with a brake system actuator member engageable with said piston.

20. The method set forth in claim 19 including the step of:
recording said distance on said housing.

21. The method set forth in claim 17 wherein:
the step of causing said member supported in said housing to move relative to said piston includes the step of assembling a seal retainer in a bore formed in said housing and pushing said seal retainer to engage said member supported in said housing to move relative to said piston to set a predetermined length of said actuating part.

22. The method set forth in claim 15 including the steps of:

providing a tool for engaging one of said actuating part and said member supported in said housing directly or indirectly, said tool having a predetermined dimension relating to the amount of maximum opening distance of said closure member with respect to a seat therefor; and engaging said one of said actuating part and said member supported in said housing with said tool to set said dimension of said actuating part.

23. The method set forth in claim 22 including the steps of:

holding said closure member in a closed position engaged with said seat with a predetermined force prior to engaging said actuating part to set said dimension.

* * * * *